(12) United States Patent
Tsuda et al.

(10) Patent No.: US 9,506,559 B2
(45) Date of Patent: Nov. 29, 2016

(54) CONTROL DEVICE AND CONTROL METHOD FOR TRANSMISSION

(71) Applicant: AISIN AW CO., LTD., Anjo-shi, Aichi-ken (JP)

(72) Inventors: Kohei Tsuda, Nishio (JP); Keiichirou Kusabe, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 56 days.

(21) Appl. No.: 14/433,997

(22) PCT Filed: Dec. 25, 2013

(86) PCT No.: PCT/JP2013/084752
§ 371 (c)(1),
(2) Date: Apr. 7, 2015

(87) PCT Pub. No.: WO2014/104133
PCT Pub. Date: Jul. 3, 2014

(65) Prior Publication Data
US 2015/0260281 A1    Sep. 17, 2015

(30) Foreign Application Priority Data

Dec. 25, 2012 (JP) ................................ 2012-280717

(51) Int. Cl.
| | |
|---|---|
| *B60W 10/02* | (2006.01) |
| *F16H 61/04* | (2006.01) |
| *F16H 61/686* | (2006.01) |
| *F16H 59/42* | (2006.01) |
| *F16H 59/74* | (2006.01) |

(52) U.S. Cl.
CPC .............. *F16H 61/04* (2013.01); *F16H 59/42* (2013.01); *F16H 59/74* (2013.01); *F16H 61/686* (2013.01); *F16H 2061/044* (2013.01); *F16H 2200/0052* (2013.01); *F16H 2200/2007* (2013.01); *F16H 2200/2043* (2013.01); *F16H 2200/2082* (2013.01); *F16H 2312/14* (2013.01)

(58) Field of Classification Search
CPC ..................................................... B60W 10/02
See application file for complete search history.

(56) References Cited

U.S. PATENT DOCUMENTS

| | | | | |
|---|---|---|---|---|
| 8,864,623 | B2* | 10/2014 | Doering ............. | B60W 10/023 477/175 |
| 8,924,107 | B2* | 12/2014 | Ichikawa ............ | F16H 61/0021 180/336 |

(Continued)

FOREIGN PATENT DOCUMENTS

| | | |
|---|---|---|
| JP | 2005-147238 A | 6/2005 |
| JP | 2007-100762 A | 4/2007 |
| JP | 2010-223399 A | 10/2010 |

*Primary Examiner* — Tisha Lewis
(74) *Attorney, Agent, or Firm* — Oliff PLC (57) ABSTRACT

A speed change ECU, in a case in which any one of a second speed to a fourth speed is established when the operation of the engine is stopped by an idle stop control, determines whether a rotation number of the engine is less than a synchronous rotation number of an input shaft that is defined based on a gear ratio (speed change ratio) γ1 at a first speed and a vehicle speed, in a case in which it is determined that the rotation number is equal to or greater than the synchronous rotation number, does not disengage any one of a brake, a clutch, and a clutch serving as a second engagement element, and in a case in which the rotation number is less than the synchronous rotation number, disengages any one of the brake, the clutch, and the clutch serving as the second engagement element.

8 Claims, 5 Drawing Sheets

(56) References Cited

U.S. PATENT DOCUMENTS

| | | | |
|---|---|---|---|
| 9,020,719 B2* | 4/2015 | Tomoda | F16D 48/06 701/51 |
| 9,096,217 B2* | 8/2015 | Suzuki | B60W 10/04 |
| 2007/0078040 A1 | 4/2007 | Nobumoto et al. | |
| 2010/0250075 A1 | 9/2010 | Suzuki et al. | |

* cited by examiner

|   |   | C-1 | C-2 | C-3 | B-1 | B-2 | F-1 |
|---|---|---|---|---|---|---|---|
| P |   |   |   |   |   |   |   |
| REV |   |   |   | ○ |   | ○ |   |
| N |   |   |   |   |   |   |   |
| D | 1st | ○ |   |   |   | ● | ○ |
|   | 2nd | ○ |   |   | ○ |   |   |
|   | 3rd | ○ |   | ○ |   |   |   |
|   | 4th | ○ | ○ |   |   |   |   |
|   | 5th |   | ○ | ○ |   |   |   |
|   | 6th |   | ○ |   | ○ |   |   |

※ ○: ENGAGED  ●: ENGAGED WHEN ENGINE BRAKING IS IN OPERATION

CONTROL DEVICE AND CONTROL METHOD FOR TRANSMISSION

TECHNICAL FIELD

Disclosed embodiments relate to a control device and a control method for a transmission installed in a vehicle having a power generation source whose operation is automatically stopped as the vehicle becomes stationary, and capable of changing motive power applied to an input shaft from the power generation source at speed change ratios corresponding to a plurality of shift speeds established by engaging and disengaging a plurality of engagement elements and transferring the resultant motive power to an output shaft.

BACKGROUND ART

Hitherto, there has been known a control device for a transmission that is capable of establishing a one-way transmission speed at which rotational driving force is transferred from an input shaft to an output shaft but the rotational driving force is not transferred from the output shaft to the input shaft (refer to Patent Document 1, for example). The transmission establishes the one-way transmission speed by engaging both a first engagement element among a plurality of engagement elements and a one-way clutch. In a case in which a shift speed is established by engaging both the first engagement element and an engagement element other than the one-way clutch when stopping (idle stop) an operation of an engine due to an establishment of an idle stop condition including a case in which the vehicle becomes stationary and a case in which the output of the engine decreases in a so-called coast state, the aforementioned control device disengages the engagement element other than the one-way clutch. Thereby, the one-way transmission speed is established by the one-way clutch being engaged while the engagement of the first engagement element is maintained. Therefore, it is possible to improve responsiveness of driving force transmission at a time of re-start of the engine while avoiding drag of the engine during the engine being stopped. In the transmission described in Patent Document 1, the hydraulic pressure from an electrically powered pump is supplied to the first engagement element while the operation of a mechanical oil pump is stopped due to the operation stop of the engine.

RELATED ART DOCUMENT

Patent Document

Patent Document 1: Japanese Patent Application Publication No. 2010-223399 (JP 2010-223399 A)

SUMMARY

Problem to be Solved

Here, when stopping the operation of the engine as the vehicle becomes stationary, it is preferable that the operation of the engine is stopped at approximately the same time as when the vehicle becomes stationary. However, to realize it, it is necessary to start an operation stop process for the engine while the vehicle is traveling. In addition, when starting the operation stop process for the engine while the vehicle is traveling, the hydraulic pressure from the mechanical oil pump decreases along with a decrease in rotation of the engine. Therefore, it is necessary to supply a hydraulic pressure to an engagement element using the electrically powered pump before the vehicle becomes stationary. In such a case, from a viewpoint of downsizing the electrically powered pump by decreasing the load thereon, in a case in which a shift speed is established by engaging the first engagement element and an engagement element other than the one-way clutch, it is preferable to disengage the engagement element other than the one-way clutch while maintaining the engagement of the first engagement element before the vehicle becomes stationary and before the operation of the engine is stopped. However, in response to a stop request for the engine, when disengaging the engagement element other than the one-way clutch while maintaining the engagement of the first engagement element before the vehicle becomes stationary, a shock may be caused by a sudden engagement of the one-way clutch depending on a state of the vehicle.

It is an object of some disclosed embodiments to favorably suppress an occurrence of a shock that is caused by an engagement of the one-way clutch when disengaging the second engagement element that has been engaged as well as the first engagement element before the vehicle becomes stationary as the operation of the power generation source is stopped.

In order to achieve the above object, a control device and a control method for a transmission according to the present embodiment apply the following means.

A control device for a transmission according to an exemplary embodiment that is installed in a vehicle having a power generation source whose operation is automatically stopped as the vehicle becomes stationary, is capable of changing motive power applied to an input shaft from the power generation source at speed change ratios corresponding to a plurality of shift speeds established by engaging and disengaging a plurality of engagement elements and transferring the resultant motive power to an output shaft, establishes a first shift speed by engaging both a first engagement element and a one-way clutch, and establishes a shift speed having a speed change ratio smaller than the first shift speed by engaging both the first engagement element and a second engagement element, is characterized by including: a determining means for, in a case in which a shift speed having a speed change ratio smaller than the first shift speed is established when the operation of the power generation source is stopped in response to an automatic stop request for the power generation source, determining whether a non-driving state in which the input shaft of the transmission is not rotationally driven by motive force from the power generation source is established; and a disengagement control means for, in a case in which it is determined by the determining means that a driving state in which the input shaft of the transmission is rotationally driven by the motive force from the power generation source is established, not disengaging the second engagement element, and in a case in which it is determined by the determining means that the non-driving state is established, disengaging the second engagement element.

The control device for the transmission controls a transmission that establishes a first shift speed by engaging both the first engagement element and the one-way clutch and establishes a shift speed having a speed change ratio smaller than the first shift speed by engaging both the first engagement element and the second engagement element. The control device, in a case in which a shift speed having a speed change ratio smaller than the first shift speed is established when the operation of the power generation source is stopped in response to an automatic stop request for the power generation source, determines whether a non-driving state in which the input shaft of the transmission is not rotationally driven by the motive force from the power generation source is established, and in a case in which it is determined that a driving state in which the input shaft of the transmission is rotationally driven by the motive force from the power generation source is established, not disengages the second engagement element, and in a case in which it is determined that the non-driving state is established, disengages the second engagement element. Thereby, it is possible to suppress that the one-way clutch is engaged in the driving state and to establish the first shift speed by mildly engaging the one-way clutch while maintaining the engagement of the first engagement element in the non-driving state. Consequently, according to the control device, in response to an automatic stop request for the power generation source, it is possible to favorably suppress an occurrence of a shock that is caused by the engagement of the one-way clutch when disengaging the second engagement element that has been engaged as well as the first engagement element before the vehicle becomes stationary.

The determining means, in a case in which a rotation number of the power generation source is equal to or greater than a synchronous rotation number of the input shaft that is defined based on a speed change ratio at the first shift speed and a vehicle speed or a rotation number of the output shaft, may determine that the driving state is established, and in a case in which the rotation number of the power generation source is less than the synchronous rotation number, may determine that the non-driving state is established. Thereby, it is possible to appropriately determine whether the driving state or the non-driving state is established. Therefore, it is possible to favorably suppress that the one-way clutch is engaged in the driving state and to establish a first shift speed by mildly engaging the one-way clutch while maintaining the engagement of the first engagement element in the non-driving state.

In addition, even in a case in which it is determined by the determining means that the driving state is established, the disengagement control means may disengage the second engagement element in a case in which the vehicle is stationary. Thereby, it is possible to favorably ensure re-start performance by establishing the first shift speed before the vehicle re-starts.

In addition, the second engagement element may include a plurality of engagement elements and a plurality of shift speeds may be included as the shift speed having the speed change ratio smaller than the first shift speed. Thereby, even in a case in which any one of shift speeds having speed change ratios smaller than the first shift speed is established when the operation of the power generation source is stopped as the vehicle becomes stationary, it is possible to favorably suppress an occurrence of a shock that is caused by an engagement of the one-way clutch when disengaging the second engagement element that has been engaged as well as the first engagement element before the vehicle becomes stationary.

In addition, the first shift speed may be a shift speed that is established when the vehicle starts moving, and in a case in which the first engagement element is disengaged, an operation stop of the power generation source as the vehicle becomes stationary may be prohibited. Thereby, it is possible to favorably ensure re-start performance after the vehicle becomes stationary by smoothly establishing the first shift speed that is a starting speed when the operation of the power generation source is stopped as the vehicle becomes stationary. In a case in which the first engagement element is in a disengaged state, the operation stop of the power generation source as the vehicle becomes stationary is prohibited. Therefore, by engaging the first engagement element that has been disengaged, and thereafter disengaging the second engagement element as described above, it is possible to favorably suppress an occurrence of a shock that is caused by an engagement of the one-way clutch.

In addition, the power generation source and the input shaft of the transmission may be coupled via a torque converter. That is, in a case in which the power generation source and the input shaft of the transmission are coupled via a torque converter, when stopping the operation of the power generation source after the vehicle becomes stationary, a feeling of discomfort may be given to a driver of a vehicle because torque is amplified at the torque converter after the vehicle becomes stationary until the operation of the power generation source is stopped and transferred to the input shaft. On the other hand, according to the present embodiment, it is possible to suppress an occurrence of a shock that is caused by a sudden engagement of the one-way clutch and stop the operation of the power generation source before the vehicle becomes stationary. Consequently, the present embodiment is highly preferable for a transmission having an input shaft coupled to a power generation source via a torque converter.

In addition, the vehicle may include an electrically powered pump that supplies a hydraulic pressure to the first engagement element when the rotation number of the power generation source becomes equal to or less than a threshold value that is previously determined in response to the automatic stop request for the power generation source. Thereby, it is possible to supply a hydraulic pressure from the electrically powered pump to the first engagement element and maintain the engagement of the first engagement element even when starting the stop operation for the power generation source before the vehicle becomes stationary in response to the automatic stop request for the power generation source.

A control method for a transmission according to the present embodiment that is installed in a vehicle having a power generation source whose operation is automatically stopped as the vehicle becomes stationary, is capable of changing motive power applied to an input shaft from the power generation source at speed change ratios corresponding to a plurality of shift speeds established by engaging and disengaging a plurality of engagement elements and transferring the resultant motive power to an output shaft, establishes a first shift speed by engaging both a first engagement element and a one-way clutch, and establishes a shift speed having a speed change ratio smaller than the first shift speed by engaging both the first engagement element and the second engagement element, includes the steps of: a) in a case in which a shift speed having a speed change ratio smaller than the first shift speed is established when an automatic stop request for the power generation source is provided, determining whether a non-driving state in which the input shaft of the transmission is not rotationally driven by motive force from the power generation source is established; and b) in a case in which it is determined at step a) that a driving state in which the input shaft of the transmission is rotationally driven by the motive force from the power generation source is established, not disengaging the second engagement element, and in a case in which it is determined at step a) that the non-driving state is established, disengaging the second engagement element.

According to the method, in response to an automatic stop request for the power generation source, it is possible to favorably suppress an occurrence of a shock that is caused by the engagement of the one-way clutch when disengaging the second engagement element that has been engaged as well as the first engagement element before the vehicle becomes stationary.

BEST MODES

Now, an embodiment will be described below with reference to the drawings.

Figure 1:
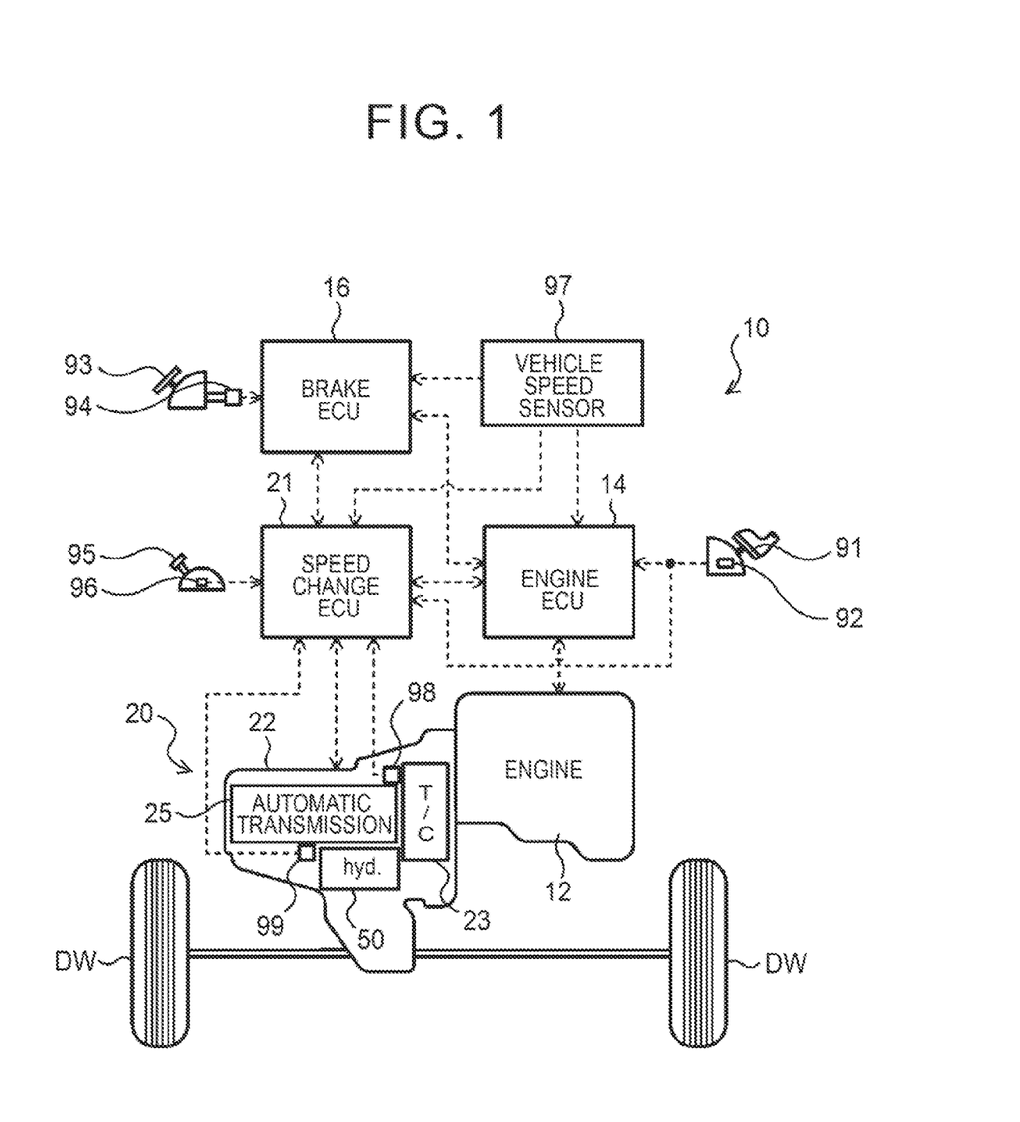
FIG. 1 shows a schematic configuration of an automobile 10 provided with a power transfer device 20 including an automatic transmission 25 that is controlled by a control device according to invention preferred embodiment.

FIG. 1 shows a schematic configuration of an automobile 10 provided with a power transfer device 20 including an automatic transmission 25 that is controlled by a control device according to the present embodiment. The automobile 10 shown in FIG. 1 includes: an engine (internal combustion engine) 12 serving as a power generation source that outputs motive power through explosive combustion of a mixture of a hydrocarbon fuel, such as gasoline and light oil, and air; an engine electronic control unit (hereinafter referred to as an "engine ECU") 14 that controls the engine 12; a brake electronic control unit (hereinafter referred to as a "brake ECU") 16 that controls an electronically controlled hydraulic brake unit (not shown); and the power transfer device 20 which is connected with the engine 12 to transfer motive power from the engine 12 to left and right drive wheels DW, and the like. The power transfer device 20 includes a transmission case 22, a fluid transmission apparatus 23, the automatic transmission 25, a hydraulic control device 50, a speed change electronic control unit (hereinafter referred to as a "speed change ECU") 21 serving as a control device according to the present embodiment that controls the transmission case 22, the fluid transmission apparatus 23, and the automatic transmission 25, the hydraulic control device 50, and the like.

The engine ECU 14 is formed as a microcomputer including a CPU (not shown) as a main component, and includes a ROM that stores various programs, a RAM that temporarily stores data, input and output ports and a communication port (none of which is shown), and the like besides the CPU. As shown in FIG. 1, the engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 97, signals from various sensors such as a crankshaft position sensor (not shown) that detects rotation position of the crankshaft, and signals from the brake ECU 16 and the speed change ECU 21. The engine ECU 14 controls an electronically controlled throttle valve, a fuel injection valve, an ignition plug, and the like (none of which is shown) on the basis of the received signals. In addition, the engine ECU 14 calculates a rotation number Ne of the engine 12 on the basis of the rotation position of the crankshaft that is detected by the crankshaft position sensor. In addition, the engine ECU 14 according to the embodiment is configured to be capable of executing idle stop control (automatic start/stop control) in which operation of the engine 12 is stopped normally when the engine 12 is brought into idle operation as the automobile 10 becomes stationary and in which the engine 12 is restarted in response to a request to start the automobile 10 made by depressing the accelerator pedal 91.

The brake ECU 16 is also formed as a microcomputer including a CPU (not shown) as a main component, and includes a ROM that stores various programs, a RAM that temporarily stores data, input and output ports and a communication port (none of which is shown), and the like besides the CPU. As shown in FIG. 1, the brake ECU 16 receives inputs such as a master cylinder pressure Pmc detected by a master cylinder pressure sensor 94 when a brake pedal 93 is depressed, the vehicle speed V from the vehicle speed sensor 97, signals from various sensors (not shown), and signals from the engine ECU 14 and the speed change ECU 21. The brake ECU 16 controls a brake actuator (hydraulic actuator) (not shown), and the like on the basis of the received signals.

The speed change ECU 21 is also formed as a microcomputer including a CPU (not shown) as a main component, and includes a ROM that stores various programs, a RAM that temporarily stores data, input and output ports and a communication port (none of which is shown), and the like besides the CPU. As shown in FIG. 1, the speed change ECU 21 receives inputs such as the accelerator operation amount Acc from the accelerator pedal position sensor 92, a shift range SR from a shift range sensor 96 that detects an operation position of a shift lever 95 to select a desired shift range from a plurality of shift ranges, the vehicle speed V from the vehicle speed sensor 97, signals from various sensors such as an input rotation number sensor 98 that detects an input rotation number (a rotation number of a turbine runner 23t or an input shaft 26 of the automatic transmission 25) Nin of the automatic transmission 25, an output rotation number sensor 99 that detects an output rotation number (a rotation number of an output shaft 27) Nout of the automatic transmission 25, and the like, and signals from the engine ECU 14 and the brake ECU 16. The speed change ECU 21 controls the fluid transmission apparatus 23 and the automatic transmission 25, that is, the hydraulic control device 50 on the basis of these signals.

Figure 2:
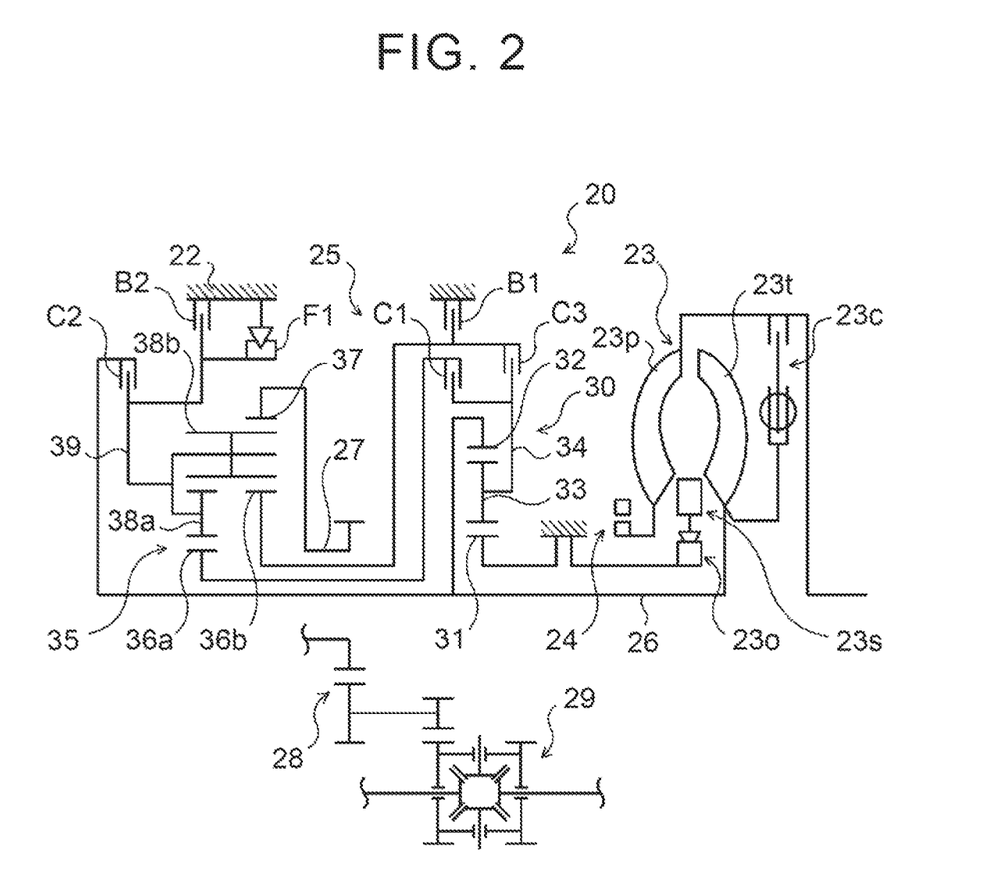
FIG. 2 shows a schematic configuration of the power transfer device 20.

The fluid transmission device 23 of the power transfer device 20 is formed as a torque converter having a torque amplifier function. As shown in FIG. 2, the fluid transmission device 23 includes: a pump impeller 23p on an input side that is connected to the crankshaft of the engine 12; the turbine runner 23t on an output side that is connected to the input shaft (input member) 26 of the automatic transmission 25; a stator 23s disposed inside the pump impeller 23p and the turbine runner 23t to rectify the flow of hydraulic oil (ATF) from the turbine runner 23t to the pump impeller 23p; a one-way clutch 23o that restricts rotation of the stator 23s to one direction; a lock-up clutch 23c, and the like. The oil pump (mechanical pump) 24 is formed as a gear pump including a pump assembly having a pump body and a pump cover, and an externally toothed gear connected via a hub to the pump impeller 23p of the fluid transmission apparatus 23. Power from the engine 12 rotates the externally toothed gear, which causes the oil pump 24 to suck hydraulic oil reserved in an oil pan (not shown) and pump to the hydraulic control device 50.

The automatic transmission 25 is formed as a 6-speed transmission. As shown in FIG. 2, the automatic transmission 25 includes a single pinion type planetary gear device 30, a Ravigneaux type planetary gear device 35, three clutches C1, C2, and C3, two brakes B1 and B3, a one-way clutch F1 to change a power transfer path from the input side to the output side, and the like. The single pinion type planetary gear device 30 includes a sun gear 31 which is an externally toothed gear fixed to the transmission case 22, a ring gear 32 which is an internally toothed gear arranged in a concentric pattern as the sun gear 31 and connected to the input shaft 26, a plurality of pinion gears 33 meshed with the sun gear 31 and meshed with the ring gear 32, and a carrier 34 that holds the plurality of pinion gears 33 so as to be rotatable about their respective axes and revolvable around a common axis.

The Ravigneaux type planetary gear mechanism 35 includes two sun gears 36a and 36b which are each an externally toothed gear, a ring gear 37 which is an internally toothed gear fixed to the output shaft (output member) 27 of the automatic transmission 25, a plurality of short pinion gears 38a meshed with the sun gear 36a, a plurality of long pinion gears 38b meshed with the sun gear 36b and the plurality of short pinion gears 38a and meshed with the ring gear 37, and a carrier 39 that holds the plurality of short pinion gears 38a and the plurality of long pinion gears 38b, which are coupled to each other, so as to be rotatable about their respective axes and revolvable around a common axis and that is supported by the transmission case 22 via the one-way clutch F1. The output shaft 27 of the automatic transmission 25 is connected to the drive wheels DW via a gear mechanism 28 and a differential mechanism 29.

The clutch C1 includes a hydraulic servo structured from a piston, a plurality of friction plates and mating plates, an oil chamber supplied with hydraulic oil, and the like, and is a multi-plate friction hydraulic clutch (friction engagement element) capable of fastening and unfastening the carrier 34 of the single-pinion type planetary gear mechanism 30 and the sun gear 36a of the Ravigneaux type planetary gear mechanism 35 to and from each other. The clutch C2 includes a hydraulic servo structured from a piston, a plurality of friction plates and mating plates, an oil chamber supplied with hydraulic oil, and the like, and is a multi-plate friction hydraulic clutch capable of fastening and unfastening the input shaft 26 and the carrier 39 of the Ravigneaux type planetary gear mechanism 35 to and from each other. The clutch C3 includes a hydraulic servo structured from a piston, a plurality of friction plates and mating plates, an oil chamber supplied with hydraulic oil, and the like, and is a multi-plate friction hydraulic clutch capable of fastening and unfastening the carrier 34 of the single-pinion type planetary gear mechanism 30 and the sun gear 36b of the Ravigneaux type planetary gear mechanism 35 to and from each other.

The brake B1 is formed as a band brake or a multi-plate friction brake including a hydraulic servo and is a hydraulic brake capable of fixing and unfixing the sun gear 36b of the Ravigneaux type planetary gear device 35 to and from the transmission case 22. The brake B2 is formed as a band brake including a hydraulic servo or a multi-plate friction brake and is a hydraulic brake capable of fixing and unfixing the carrier 39 of the Ravigneaux type planetary gear device 35 to and from the transmission case 22. The one-way clutch F1 includes, for example, an inner race and an outer race, a plurality of sprags, and the like, and transfers torque through the sprags when the outer race rotates in one direction with respect to the inner race and causes the inter race and the outer race to relatively rotate when the outer race rotates in the other direction with respect to the inner race. Note that the one-way clutch F1 may have a configuration other than a sprag type, such as a roller type.

Figure 3:
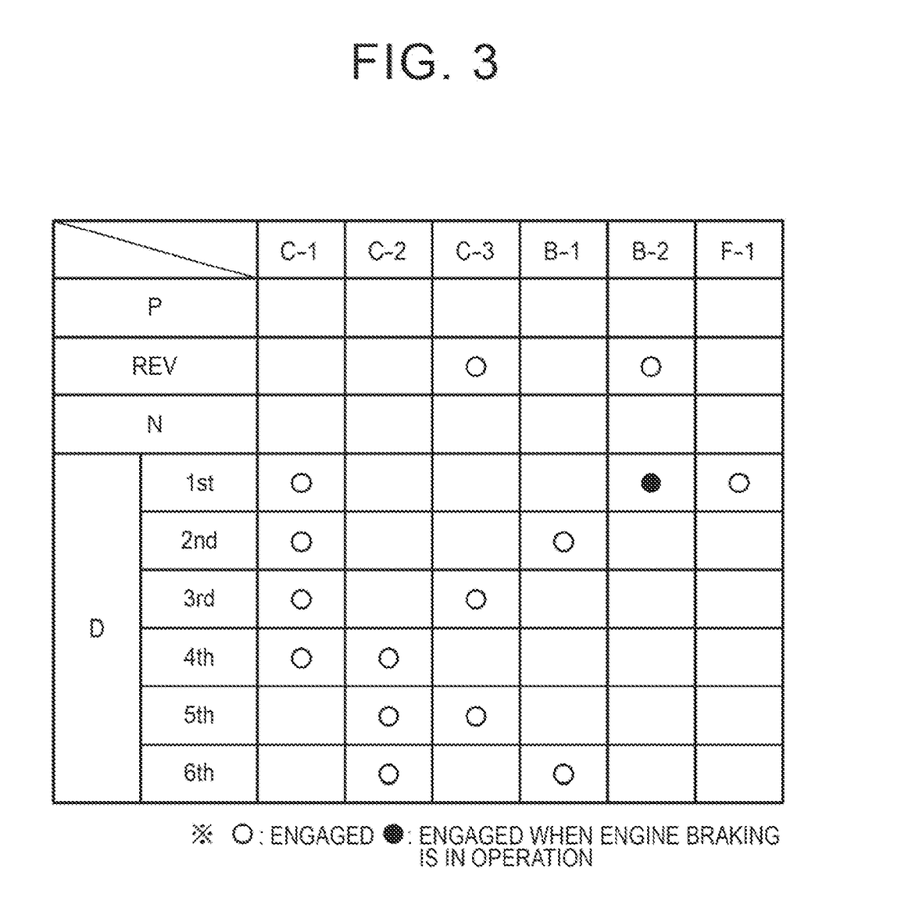
FIG. 3 is an operation table showing the relationship between each shift speed of the automatic transmission 25 and the respective operating states of clutches and brakes.

The clutches C1 to C3 and the brakes B1 and B2 operate with hydraulic oil supplied thereto and discharged therefrom by the hydraulic control device 50. FIG. 3 is an operation table showing the relationship between each shift speed of the automatic transmission 25 and the respective operating states of the clutches C1 to C3, and the brakes B1 and B2. The automatic transmission 25 provides first to sixth forward shift speeds and one reverse shift speed when the clutches C1 to C3 and the brakes B1 and B2 are brought into the respective states shown in the operation table of FIG. 3. As shown in FIG. 3, the first speed of the automatic transmission 25 is established when the one-way clutch F1 is engaged in a state in which the clutch C1 is engaged. The second to fourth speeds are established when the clutch C1 is engaged and any one of the brake B1, the clutch C2, and the clutch C3 is engaged. The fifth speed and the sixth speed of the automatic transmission 25 are established when the clutch C2 is engaged and either the clutch C3 or the brake B1 is engaged. Note that at least one of the clutches C1 to C3, and the brakes B1 and B2 may be a meshing engagement element such as a dog clutch.

Figure 4:
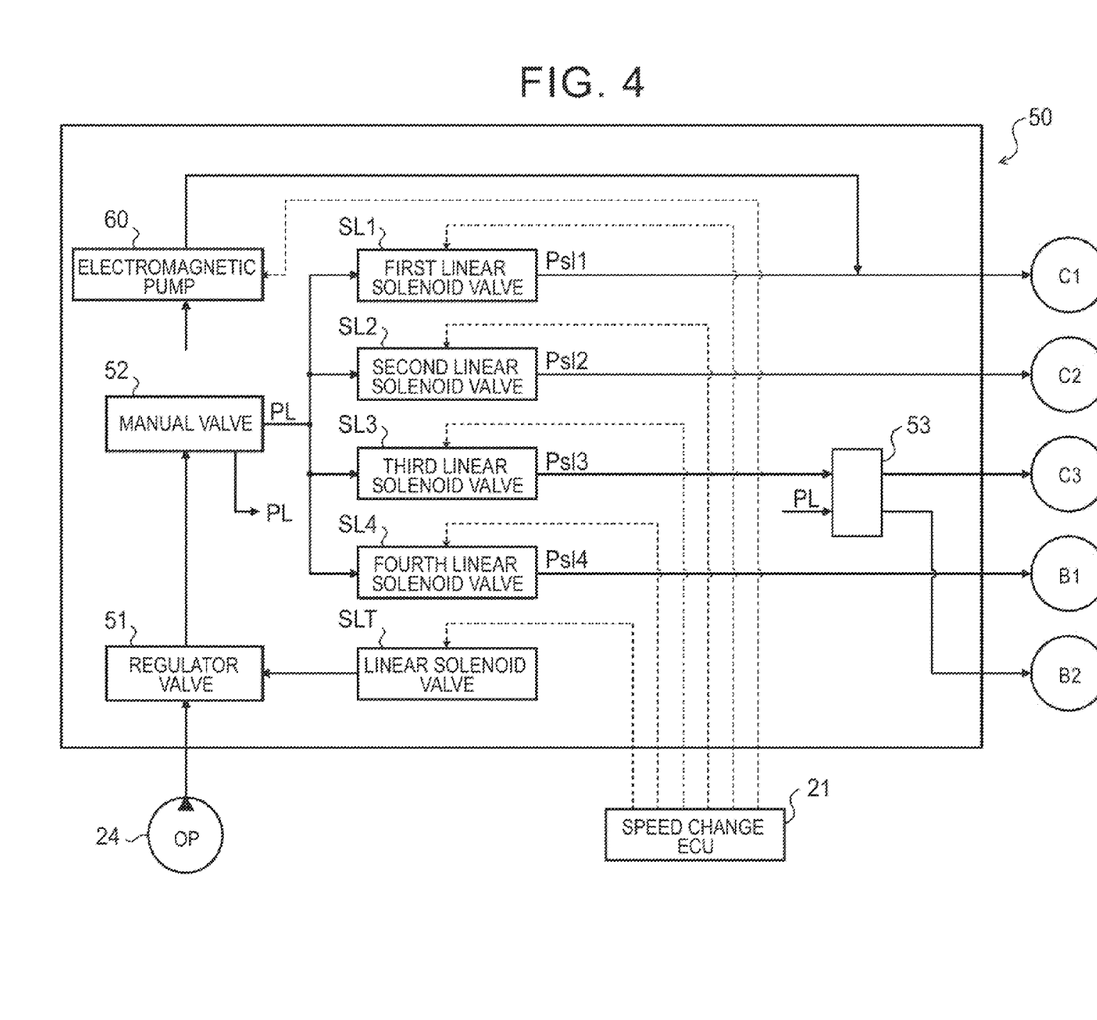
FIG. 4 is a system diagram showing a hydraulic control device 50.

FIG. 4 is a system diagram showing the hydraulic control device 50. The hydraulic control device 50 is connected to the oil pump 24 discussed above which is driven by motive power from the engine 12 to suck and discharge hydraulic oil from the oil pan. The hydraulic control device 50 generates a hydraulic pressure requested by the fluid transmission apparatus 23 or the automatic transmission 25 and supplies hydraulic oil to portions to be lubricated such as various bearings. The hydraulic control device 50 includes a valve body (not shown), a primary regulator valve 51 that regulates the pressure of hydraulic oil from the oil pump 24 to generate a line pressure PL, a manual valve 52 that switches the supply destination of the line pressure PL from the primary regulator valve 51 in accordance with the operating position of the shift lever 95, an application control valve 53, a first linear solenoid valve SL1, a second linear solenoid valve SL2, a third linear solenoid valve SL3, a fourth linear solenoid valve SL4 each serving as a pressure adjusting valve that regulates the line pressure PL as source pressure that is supplied from the manual valve 52 (primary regulator valve 51), and the like to generate a hydraulic pressure for a corresponding clutch, and the like.

The primary regulator valve 51 is driven by a hydraulic pressure from a linear solenoid valve SLT that is controlled by the speed change ECU 21 to regulate the pressure of hydraulic oil from the oil pump 24 side (for example, a modulator valve that regulates the line pressure PL to output a constant hydraulic pressure) in accordance with the accelerator operation amount Acc or the opening degree of the throttle valve. The manual valve 52 includes a spool that is axially slidable in conjunction with the shift lever 95, an input port to which the line pressure PL is supplied, a drive range output port that communicates with respective input ports of the first to fourth linear solenoid valve SL1 to SL4 via an oil passage, a reverse range output port (none of which is shown), and the like. When a forward travel shift range such as a drive range or a sport range is selected by a driver, the line pressure PL (drive range pressure) from the primary regulator valve 51 is supplied to the first to fourth linear solenoid valves SL1 to SL4 as source pressure via the drive range output port of the manual valve 52. When a reverse range is selected by the driver, the spool of the manual valve 52 allows the input port to communicate with only the reverse range output port. When a parking range or a neutral range is selected by the driver, communication between the input port, the drive range output port, and the reverse range output port of the manual valve 52 is blocked.

The application control valve 53 is a spool valve capable of selectively establishing a first state in which the hydraulic pressure from the third linear solenoid valve SL3 is supplied to the clutch C3, a second state in which the line pressure PL from the primary regulator valve 51 is supplied to the clutch C3 and the line pressure PL (reverse range pressure) from the reverse range output port of the manual valve 52 is supplied to the brake B2, a third state in which the line pressure PL (reverse range pressure) from the reverse range output port of the manual valve 52 is supplied to the clutch C3 and the brake B2, and a fourth state in which the hydraulic pressure from the third linear solenoid valve CL3 is supplied to the brake B2.

The first linear solenoid valve SL1 is a normally closed linear solenoid valve that regulates the line pressure PL from the manual valve 52 in accordance with an applied current to generate a hydraulic pressure Ps11 for the clutch C1. The second linear solenoid valve SL2 is a normally closed linear solenoid valve that regulates the line pressure PL from the manual valve 52 in accordance with an applied current to generate a hydraulic pressure Ps12 for the clutch C2. The third linear solenoid valve SL3 is a normally closed linear solenoid valve that regulates the line pressure PL from the manual valve 52 in accordance with an applied current to generate a hydraulic pressure Ps13 for the clutch C3 or the brake B2. The fourth linear solenoid valve SL4 is a normally closed linear solenoid valve that regulates the line pressure PL from the manual valve 52 in accordance with an applied current to generate a hydraulic pressure Ps14 for the brake B1. That is, the hydraulic pressures to the clutches C1 to C3 and the brakes B1 and B2, which are friction engagement elements of the automatic transmission 25, are each directly controlled (set) by a corresponding solenoid valve among the first, second, third, and fourth linear solenoid valve SL1, SL2, SL3, and SL4.

When the idle stop control is executed by the engine ECU 14 and the operation of the engine 12 is stopped, a discharge pressure of the oil pump 24 decreases along with a rotation decrease or an operation stop of the engine 12, the line pressure PL decreases due to stop of driving, thereby the first linear solenoid valve SL1 corresponding to the clutch C1 serving as a starting clutch, which is engaged when the first speed (starting speed) of the automatic transmission 25 is established, becomes unable to generate the hydraulic pressure PS11. Therefore, as shown in FIG. 4, the hydraulic control device 50 includes an electromagnetic pump (electrically powered pump) 60 and is configured to be capable of supplying the hydraulic pressure from the electromagnetic pump 60 to the clutch C1. The electromagnetic pump 60 includes a known configuration and is driven by electric power from an auxiliary battery (not shown) and suck and discharge hydraulic oil from the oil pan.

A pump that is capable of generating a hydraulic pressure, at which the engagement (full engagement) of the clutch C1 (single engagement element) is maintained while the operation of the engine 12 is stopped, is utilized as the electromagnetic pump 60. Thereby, the electromagnetic pump 60 can be downsized, the hydraulic control device 50 can be compactified, and the cost can be lowered. In addition, in the present embodiment, during an operation stop of the engine 12 due to the idle stop control while the automobile 10 is stationary, it is not necessary to maintain the clutch C1 so as to be in the full engagement state. Therefore, in order to reduce the electric power consumption, the electromagnetic pump 60 is controlled so as to generate a hydraulic pressure at which it is possible to cause the clutch C1 to be in a state immediately before the engagement (at which it is possible to move a piston such that stroke is stopped).

In place of the electromagnetic pump 60, a common electrically powered pump that is driven by an electric motor, and the like may be utilized. The electromagnetic pump 60 or the electrically powered pump, which generates a hydraulic pressure at which it is possible to move the piston of the clutch C1 such that the stroke is stopped, may be utilized. In addition, a switching valve (not shown), which is capable of establishing a first state in which the hydraulic pressure Ps11 from the first linear solenoid valve SL1 can be supplied to the clutch C1 and a second state in which the hydraulic pressure from the electromagnetic pump 60 can be supplied to the clutch C1, may be allocated between the clutch C1 and the first linear solenoid valve SL1 and the electromagnetic pump 60.

The first to fourth linear solenoid valves SL1 to SL4 discussed above (respective currents applied thereto) are controlled by the speed change ECU 21. Specifically, along with a change between shift speeds, i.e., an upshift or a downshift, the speed change ECU 21 sets a hydraulic pressure command value (engagement pressure command value) for any one of the first to fourth linear solenoid valves SL1 to SL4 corresponding to a clutch or a brake (engagement side element) being engaged along with a change in the shift speed such that a target shift speed corresponding to the accelerator operation amount Acc (or, the opening degree of the throttle valve) and a vehicle speed V acquired from a predetermined speed change line diagram (not shown) is established. In addition, along with a change between shift speeds, i.e., an upshift or a downshift, the speed change ECU 21 sets a hydraulic pressure command value (disengagement pressure command value) for any one of the first to fourth linear solenoid valves SL1 to SL4 corresponding to a clutch or a brake (disengagement side element) being disengaged along with a change in the shift speed. Further, during the change between shift speeds or after a completion of the shift speed change, the speed change ECU 21 sets a hydraulic pressure command value (holding pressure command value) for one or two of the first to fourth linear solenoid valves SL1 to SL4 corresponding to a clutch or a brake that is in an engaged state. The speed change ECU 21 controls a drive circuit (not shown) to set currents to the first to fourth linear solenoid valves SL1 to SL4, on the basis of the set hydraulic pressure command value.

In addition, the aforementioned electromagnetic pump 60 (a current applied thereto) is also controlled by the speed change ECU 21. The speed change ECU 21 controls the drive circuit (not shown) such that a rectangular-wave current at a specified duty ratio is applied to the electromagnetic pump 60 from a time when a rotation number Ne of the engine 12 becomes equal to or less than a predetermined threshold value (for example, a rotation number of the engine 12 when a discharge pressure of the oil pump 24 becomes equal to or less than a specified pressure) until the rotation number of the engine 12 exceeds the threshold value or a specified value that is slightly greater than the threshold value after restarting. Therefore, even when the rotation number of the engine 12 decreases or the operation stops (the discharge pressure of the oil pump 24 decreases or a hydraulic pressure is not generated) due to the aforementioned idle stop control in a state in which a forward travel shift range such as the drive range is selected by the driver, it is possible to maintain the automatic transmission 25 to be in a start stand-by state (a state in which the clutch C1 is engaged) by supplying a hydraulic pressure from the electromagnetic pump 60 to the clutch C1 serving as the starting clutch.

Subsequently, a control procedure of the automatic transmission 25 by the speed change ECU 21 when the idle stop control is executed by the engine ECU 14 as the automobile 10 becomes stationary is explained.

Figure 5:
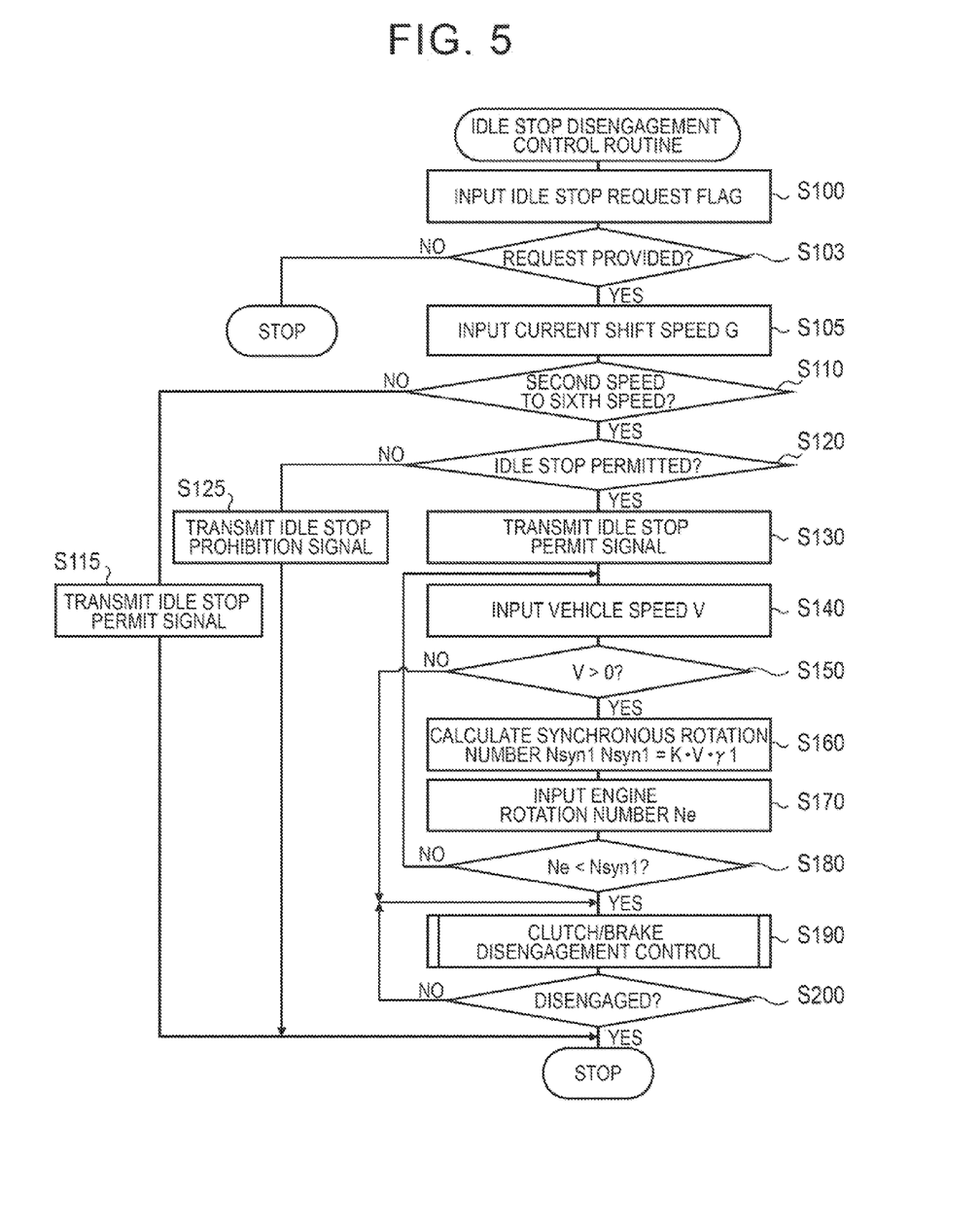
FIG. 5 is a flowchart showing an example of an idle stop disengagement control routine executed by a speed change ECU 21 that is the control device according to a preferred embodiment.

FIG. 5 is a flowchart showing an example of an idle stop disengagement control routine executed by the speed change ECU 21. As shown in FIG. 5, the speed change ECU 21 (CPU) inputs a value of an idle stop request flag that is stored in the RAM at intervals of a specified period of time (for example, several m Sec when the idle stop control is not executed) while the automobile 10 is traveling. In addition, the speed change ECU 21 determines whether an execution of the idle stop control is requested, i.e., whether an idle stop request (automatic stop request for the engine 12) is provided by the engine ECU 14 which determines to execute the idle stop control as the automobile 10 becomes stationary on the basis of the value of the idle stop request flag (Step S103).

In the present embodiment, the engine ECU 14 determines whether the automobile 10 is decelerated and stopped due to a brake operation by the driver on the basis of, for example, a brake-on signal that is transmitted from the brake ECU 16 when the brake pedal 93 is depressed by a driver, a deceleration/acceleration detected by an acceleration sensor (G sensor) (not shown) or acquired by calculation, a vehicle speed V, and the like. When it is determined that the automobile 10 is decelerated and stopped, the engine ECU 14 transmits an idle stop request signal to the speed change ECU 21. In addition, when the speed change ECU 21 receives an idle stop request signal (automatic stop request) from the engine ECU 14, the speed change ECU 21 sets the idle stop request flag to a value 1. The idle stop request flag is set to a value 0 when the engine 12 restarts after the idle stop control is executed.

In a case in which the speed change ECU 21 determines that the idle stop request flag is set to a value 0 and an idle stop request is not provided by the engine ECU 14 (an idle stop request signal is not received), the speed change ECU 21 terminates the present routine without executing the subsequent processes. On the other hand, the speed change ECU 21 determines at Step S103 that the idle stop request flag is set to a value 1 and an idle stop request is provided by the engine ECU 14 (an idle stop request signal is received), the speed change ECU 21 inputs a current shift speed G that is stored in the RAM (Step S105) and determines whether the input current shift speed G is any one of the second speed to the sixth speed (Step S110).

In a case in which the current shift speed G is the first speed, to permit an execution of the idle stop control, i.e., an operation stop of the engine 12 as the automobile 10 becomes stationary, the speed change ECU 21 transmits an idle stop permit signal to the engine ECU 14 (Step S115) and terminates the present routine without executing other processes. Specifically, in a case in which it is determined at Step S110 that the current shift speed G is the first speed, the clutch C1 as the first engagement element serving as a starting clutch is engaged as well as the one-way clutch F1 and there is not engagement element to be disengaged. Therefore, an execution of the idle stop control is permitted without executing the subsequent processes. When an idle stop signal is transmitted from the speed change ECU 21 to the engine ECU 14, the execution of the idle stop control by the engine ECU 14 is permitted and the engine ECU 14 controls the engine 12 so as to stop the operation, for example, at approximately the same time as when the automobile 10 becomes stationary, in accordance with a predetermined control procedure.

In a case in which the current shift speed G is any one of the second speed to the sixth speed, the speed change ECU 21 determines whether to permit an execution of the idle stop control (Step S120). In a case in which the current shift speed G is the fifth speed or the sixth speed or in a case in which a downshift from the sixth speed to the fifth speed is executed, the clutch C1 serving as the starting clutch is not engaged (refer to FIG. 3). Therefore, the speed change ECU 21 determines at Step S120 that an execution of the idle stop control, i.e., an operation stop of the engine 12 as the automobile 10 becomes stationary should be prohibited. In such a case, the speed change ECU 21 transmits an idle stop prohibition signal to the engine ECU 14 (Step S125) and terminates the present routine. In the present embodiment, in a case in which the present routine is terminated because a negative determination is provided at Step S120, in order to establish the second speed or the third speed, the speed change ECU 21 controls the hydraulic control device 50 to disengage the clutch C2 and engage the clutch C1.

On the other hand, in a case in which the current shift speed G is any one of the first speed to the fourth speed, or in a case in which a downshift among the first speed to the fourth speed is executed, the clutch C1 serving as the starting clutch is engaged (refer to FIG. 3). Therefore, the speed change ECU 21 determines at Step S120 that an execution of the idle stop control, i.e., an operation stop of the engine 12 as the automobile 10 becomes stationary should be permitted. In such a case, in order to permit an execution of the idle stop control, i.e., an operation stop of the engine 12 as the automobile 10 becomes stationary, the speed change ECU 21 transmits an idle stop permit signal to the engine ECU 14 (Step S130). Thereby, as mentioned above, the engine ECU 14 controls the engine 12 so as to stop the operation, for example, at approximately the same time as when the automobile 10 becomes stationary, in accordance with the predetermined control procedure.

In addition, in a case in which a downshift from the fifth speed or the sixth speed to any one of the first speed, the second speed, the third speed, and the fourth speed is executed, the speed change ECU 21 determines at Step S120 whether the clutch C1 is in a state immediately before the engagement (the stroke of the piston is stopped) on the basis of a hydraulic pressure command value to the first linear solenoid valve SL1 that corresponds to the clutch C1. When the clutch C1 becomes in the state immediately before the engagement, the speed change ECU 21 assumes that any one of the first speed, the second speed, the third speed, and the fourth speed is established by the engagement of the clutch C1 and determines that an execution of the idle stop control, i.e., an operation stop of the engine 12 as the automobile 10 becomes stationary should be permitted. In such a case, in order to permit an execution of the idle stop control, i.e., an operation stop of the engine 12 as the automobile 10 becomes stationary, the speed change ECU 21 transmits an idle stop permit signal to the engine ECU 14 (Step S130) and the engine ECU 14 controls the engine 12 so as to stop the operation, for example, at approximately the same time as when the automobile 10 becomes stationary in accordance with the predetermined control procedure.

After the process at Step S130, the speed change ECU 21 inputs a vehicle speed V from the vehicle speed sensor 97 (Step S140) and determines whether the vehicle speed V exceeds a value 0, i.e., whether the automobile 10 is traveling (Step S150). In a case in which it is determined at Step S150 that the vehicle speed V exceeds a value 0 and the automobile 10 is traveling (not stationary), the speed change ECU 21 calculates a synchronous rotation number Nsyn1 of the input shaft 26 at the first speed of the automatic transmission 25 as Nsyn1=K·V—γ1 on the basis of the vehicle speed V input at Step S150, a gear ratio γ1 at the first speed of the automatic transmission 25, and a conversion coefficient K on the basis of a final deceleration ratio γ of a gear mechanism 28 and a differential mechanism, an external diameter of a tire, and the like. (Step S160). Note that the synchronous rotation number Nsyn1 of the input shaft 26 at the first speed may be calculated on the basis of a rotation number Nout of the output shaft 27 that is detected by the output rotation number sensor 99 and the gear ratio γ1 at the first speed. Subsequently, the speed change ECU 21 inputs the rotation number Ne of the engine 12 from the engine ECU 14 (Step S170) and determines whether the input rotation number Ne is less than the synchronous rotation number Nsyn1 that is calculated at Step S160 (Step S180).

In a case in which it is determined at Step S180 that the rotation number Ne of the engine 12 is equal to or greater than the synchronous rotation number Nsyn1 of the input shaft 26 at the first speed of the automatic transmission 25, the speed change ECU 21 executes the processes at Step S140 to S150 or the processes at Step S140 to S180 anew. In a case in which the processes subsequent to Step S140 are repeatedly executed, the process at Step S140 is executed at intervals of a predetermined time period (for example, several mSec). On the other hand, in a case in which it is determined at Step S180 that the rotation number Ne of the engine 12 is less than the synchronous rotation number Nsyn1 of the input shaft 26 at the first speed of the automatic transmission 25, the speed change ECU 21 does not disengage the clutch C1 as the first engagement element (maintains the engagement) and starts a disengagement process for any one of the brake B1, the clutch C2, and the clutch C3 as the second engagement element that is engaged as well as the clutch C1 along with the establishment of the current shift speed G (any one of the second speed, the third speed, and the fourth speed) input at Step S100 (Step S190).

Until it is determined at Step S200 that the brake B1, the clutch C2, or the clutch C3 that is target is fully disengaged, the speed change ECU 21 sets a hydraulic pressure command value to the brake B1, etc., being disengaged, controls any one of the second to fourth linear solenoid valves SL2 to SL4 corresponding to the brake B1, etc, being disengaged on the basis of the hydraulic pressure command value, and terminates the present routine at a time when it is determined that the brake B1, etc., that is target at Step S200 is fully disengaged. In addition, in a case in which it is determined at Step S150 that the vehicle speed V is a value 0 and the automobile 10 is stationary, the speed change ECU 21 executes a disengagement process for the brake B1, etc., that is engaged as well as the clutch C1 along with the establishment of the current shift speed G input at Step S100 (Step S190), and terminates the present routine at a time when it is determined that the brake B1, etc., that is target at Step S200 is fully disengaged.

As a result of the aforementioned process, in a case in which it is determined at S180 that the rotation number Ne of the engine 12 is equal to or greater than the synchronous rotation number Nsyn1 of the input shaft 26 at the first speed, any one of the brake B1, the clutch C2, and the clutch C3 serving as the second engagement element is maintained to be in an engaged state without being disengaged. Thereby, the one-way clutch F1 is not engaged in a driving state in which the input shaft 26 of the automatic transmission 25 is rotationally driven by the torque from the engine 12 in a case in which the rotation number Ne of the engine 12 is equal to or greater than the synchronous rotation number Nsyn1. On the other hand, in a case in which it is determined at Step S180 that the rotation number Ne of the engine 12 is less than the synchronous rotation number Nsyn1 of the input shaft 26 at the first speed, the input shaft 26 of the automatic transmission 25 is not rotationally driven by the torque from the engine 12. Consequently, in a case in which it is determined that the rotation number Ne of the engine 12 is less than the synchronous rotation number Nsyn1, any one of the brake B1, the clutch C2, and the clutch C3 serving as the second engagement element is disengaged while the clutch C1 serving as the first engagement element is maintained to be engaged, thereby it is possible to mildly engage the one-way clutch F1 in a non-driving state in which the input shaft 26 of the automatic transmission 25 is not rotationally driven by the torque from the engine 12, and establish the first speed.

Thereby, it is possible to favorably suppress an occurrence of a shock that is caused when the one-way clutch F1 is engaged (engaged by itself) when disengaging any one of the brake B1, the clutch C2, and the clutch C3, which is engaged as well as the clutch C1, along with an operation stop of the engine 12. As mentioned above, a hydraulic pressure from the electromagnetic pump 60 is supplied to the clutch C1 from a time point at which the rotation number Ne of the engine 12 becomes equal to or less than a threshold value that is previously determined before the automobile 10 becomes stationary. Therefore, even when the hydraulic pressure from the oil pump 24 decreases before the automobile 10 becomes stationary along with an operation stop of the engine 12, the engagement of the clutch C1 can be maintained because of the hydraulic pressure from the electromagnetic pump 60.

As described above, the speed change ECU 21 serving as a control device in the present embodiment controls the automatic transmission 25, which establishes the first speed by engaging both the clutch C1 serving as the first engagement element and the one-way clutch F1 and establishes the second speed to the fourth speed having speed ratios (deceleration ratio) smaller (acceleration side) than the first speed by engaging both the clutch C1 and any one of the brake B1, the clutch C2, and the clutch C3 serving as the second engagement element. In a case in which any one of the second speed to the fourth speed on the acceleration side is established when the operation of the engine 12 is stopped in response to an idle stop request (automatic stop request for the engine 12), the speed change ECU 21 determines whether the rotation number Ne of the engine 12 is less than the synchronous rotation number Nsyn1 of the input shaft 26 that is defined based on the gear ratio (speed ratio) γ1 at the first speed and the vehicle speed V (alternatively, the rotation number Nout of the output shaft 27) (Step S180 in FIG. 5). In addition, in a case in which it is determined that the rotation number Ne of the engine 12 is equal to or greater than the synchronous rotation number Nsyn1, the speed change ECU 21 does not disengage any one of the brake B1, the clutch C2, and the clutch C3 serving as the second engagement element. In a case in which it is determined that the rotation number Ne of the engine 12 is less than the synchronous rotation number Nsyn1, the speed change ECU 21 disengages any one of the brake B1, the clutch C2, and the clutch C3 serving as the second engagement element (Step S140 to S180 in FIG. 5).

In such a manner, it is possible to suppress that the one-way clutch F1 is engaged in the driving state in which the input shaft 26 of the automatic transmission 25 is rotationally driven by the torque from the engine 12 and also establish the first speed by mildly engaging the one-way clutch F1 while maintaining the engagement of the clutch C1 in the non-driving state in which the input shaft 26 of the automatic transmission 25 is not rotationally driven by the torque from the engine 12. Consequently, it is possible at the automatic transmission 25 to favorably suppress an occurrence of a shock that is caused by the engagement of the one-way clutch F1 when, in response to an idle stop request from the engine ECU 14, disengaging any one of the brake B1, the clutch C2, and the clutch C3 serving as the second engagement element, which has been engaged as well as the clutch C1, before the automobile 10 becomes stationary.

In addition, in the aforementioned embodiment, the speed change ECU 21 determines that the driving state is established in a case in which the rotation number Ne of the engine 12 is equal to or greater than the synchronous rotation number Nsyn1 of the input shaft 26 that is defined based on the speed ratio γ1 at the first speed and the vehicle speed V (alternatively, the rotation number Nout of the output shaft 27), and determines that the non-driving state is established in a case in which the rotation number Ne of the engine 12 is less than the synchronous rotation number Nsyn1 (Step S160 to S180). Thereby, it is possible to appropriately determine whether the driving state or the non-driving state is established. Therefore, it is possible to favorably suppress that the one-way clutch F1 is engaged in the driving state and also establish the first speed by mildly engaging the one-way clutch F1 while maintaining the engagement of the clutch C1 in the non-driving state.

In addition, in the aforementioned embodiment, in a case in which any one of the second speed to the fourth speed having speed ratios smaller than the first speed is established when the operation of the engine 12 is stopped as the automobile 10 becomes stationary, it is possible to favorably suppress an occurrence of a shock that is caused by the engagement of the one-way clutch F1 when disengaging any one of the brake B1, the clutch C2, and the clutch C3 serving as the second engagement element before the automobile 10 becomes stationary.

Also, in the aforementioned embodiment, the first speed serving as a starting shift is smoothly established when the operation of the engine 12 is stopped as the automobile 10 becomes stationary. Therefore, it is possible to favorably ensure a re-start performance after the automobile 10 becomes stationary. While traveling in a state in which the fifth speed or the sixth speed where the clutch C1 is disengaged is established (alternatively, during execution of a downshift from the sixth speed to the fifth speed), the operation stop of the engine 12, i.e., the execution of the idle stop control as the automobile 10 becomes stationary is prohibited. Therefore, by engaging the clutch C1 that has been disengaged and thereafter disengaging the second engagement element as mentioned above, it is possible to favorably suppress an occurrence of a shock that is caused by the engagement of the one-way clutch F1.

Further, in the aforementioned embodiment, even in a case in which it is determined at Step S180 that the rotation number Ne of the engine 12 is equal to or greater than the synchronous rotation number Nsyn1 and the aforementioned driving state is established, when it is determined at Step S150 that the automobile 10 is stationary, any one of the brake B1, the clutch C2, and the clutch C3 serving as the second engagement element is disengaged. Thereby, it is possible to favorably ensure the re-start performance by establishing the first speed before the automobile 10 re-starts.

In addition, in a case in which the engine 12 is coupled to the input shaft 26 of the automatic transmission 25 via the fluid transmission apparatus 23 that is configured as a torque converter, when the operation of the engine 12 is stopped after the automobile 10 becomes stationary, a feeling of discomfort may be given to the driver because the torque is amplified at the fluid transmission apparatus 23 before the operation of the engine 12 is stopped while the automobile 10 is stationary and transferred to the input shaft 26. On the other hand, in the aforementioned embodiment, it is possible to suppress an occurrence of a shock that is caused by a sudden engagement of the one-way clutch F1 and also cause the operation of the engine 12 to stop before the automobile 10 becomes stationary. Consequently, the control by the speed change ECU 21 when executing the idle stop control as shown in FIG. 5 is highly preferable for the automatic transmission 25 having the input shaft 26 coupled to the engine 12 via the fluid transmission apparatus 23 that is configured as the torque converter.

In addition, the aforementioned automobile 10 (power transfer device 20) includes the electromagnetic pump 60 that supplies a hydraulic pressure to the clutch C1 when the rotation number Ne of the engine 12 becomes equal to or less than a threshold value that is previously determined in response to the idle stop request (automatic stop request for the engine 12). Thereby, even in a case in which stop processing for the engine 12 starts before the automobile 10 becomes stationary in response to the idle stop request, the hydraulic pressure is supplied from the electromagnetic pump 60 to the clutch C1, thereby it is possible to maintain the engagement of the clutch C1.

In the aforementioned embodiment, the oil pump 24 (external gear) is coaxially coupled to the crankshaft of the engine 12 via the pump impeller 23p. However, the oil pump 24 may be coupled on an axis different from the crankshaft of the engine 12 and driven by the motive force from the engine 12. In such a configuration, the rotation number of the oil pump 24 becomes equal to or less than a specified rotation number in a state in which one of the second speed to the fourth speed is established, a discharge amount from the oil pump 24 decreases and both the clutch C1 serving as the first engagement element and the brake B1, etc. serving as the second engagement element become in a slip state. Therefore, the one-way clutch F1 is not suddenly engaged even in a case in which the brake B1, etc. serving as the second engagement element is disengaged. Consequently, in such a configuration, even in a case in which it is determined at Step S180 in FIG. 5 that the rotation number Ne of the engine 12 is equal to or greater than the synchronous rotation number Nsyn1, when it is determined that the rotation number of the oil pump 24 is equal to or less than a specified rotation number, any one of the brake B1, the clutch C2, and the clutch C3 serving as the second engagement element may be disengaged.

Here, the correspondence between the main elements of the aforementioned embodiment and the main elements of the embodiment described in the "SUMMARY" section will be described. Specifically, in the aforementioned embodiment, the automatic transmission 25 that is installed in the automobile 10 having the engine 12 whose operation is automatically stopped as the vehicle becomes stationary, is capable of changing motive power applied to an input shaft 26 from the engine 12 at speed change ratios corresponding to a plurality of shift speeds established by engaging and disengaging the clutches C1 to C3, the brakes B1 and B2, and the one-way clutch F1 and transferring the resultant motive power to an output shaft 27, establishes a first peed by engaging both the clutch C1 and the one-way clutch F1, and establishes the second to fourth speeds having speed change ratios smaller than the first speed by engaging both the clutch C1 and any one of the brake B1, the clutch C2, and the clutch C3 serving as the second engagement element corresponds to "transmission." The speed change ECU 21 that controls the automatic transmission 25 corresponds to "control device." The speed change ECU 21 that executes the process of Step S180 in FIG. 5 corresponds to "determining means." The speed change ECU 21 that executes the processes of Steps S140 to 180 in FIG. 5 corresponds to "disengagement control means." The fluid transmission apparatus 23 corresponds to "torque converter."

The correspondence between the main elements of the aforementioned embodiment and the main elements of the embodiment described in the "SUMMARY" section does not limit the elements of the embodiment described in the "SUMMARY" section, because the embodiment is an example given for the purpose of specifically describing a mode for carrying out the invention. That is, the embodiment is merely a specific example of the invention, and should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

INDUSTRIAL APPLICABILITY

The present invention can be utilized in the transmission manufacturing industry.

The invention claimed is:

1. A vehicular transmission controller for a vehicular transmission having a power generation source whose operation is automatically stopped as the vehicle becomes stationary, is capable of changing motive power applied to an input shaft from the power generation source at speed change ratios corresponding to a plurality of shift speeds established by engaging and disengaging a plurality of engagement elements and transferring the resultant motive power to an output shaft, establishes a first shift speed by engaging both a first engagement element and a one-way clutch, and establishes a shift speed having a speed change ratio smaller than the first shift speed by engaging both the first engagement element and a second engagement element, the vehicular transmission controller configured to:
in a case in which a shift speed having a speed change ratio smaller than the first shift speed is established when the operation of the power generation source is stopped in response to an automatic stop request for the power generation source, determine whether a non-driving state in which the input shaft of the transmission is not rotationally driven by motive force from the power generation source is established; and
in a case in which it is determined that a driving state in which the input shaft of the transmission is rotationally driven by the motive force from the power generation source is established, not disengage the second engagement element, and in a case in which it is determined that the non-driving state is established, disengage the second engagement element.

2. The vehicular transmission controller according to claim 1,
wherein the vehicular transmission controller, in a case in which a rotation number of the power generation source is equal to or greater than a synchronous rotation number of the input shaft that is defined based on a speed change ratio at the first shift speed and a vehicle speed or a rotation number of the output shaft, determines that the driving state is established, and
in a case in which the rotation number of the power generation source is less than the synchronous rotation number, determines that the non-driving state is established.

3. The vehicular transmission controller according to claim 1, wherein the vehicular transmission controller, even in a case in which it is determined that the driving state is established, the controller disengages the second engagement element in a case in which the vehicle is stationary.

4. The vehicular transmission controller according to claim 1, wherein the second engagement element includes a plurality of engagement elements and a plurality of shift speeds are included as the shift speed having the speed change ratio smaller than the first shift speed.

5. The vehicular transmission controller according to claim 1, wherein the first shift speed is a shift speed that is established when the vehicle starts moving, and
in a case in which the first engagement element is in a disengaged state, the vehicular transmission controller prohibits an operation stop of the power generation source as the vehicle becomes stationary.

6. The vehicular transmission controller according claim 1, wherein the power generation source and the input shaft of the transmission are coupled via a torque converter.

7. The vehicular transmission controller according to claim 1, wherein the vehicle includes an electrically powered pump that supplies a hydraulic pressure to the first engagement element when the rotation number of the power generation source becomes equal to or less than a threshold value that is previously determined in response to the automatic stop request for the power generation source.

8. A control method for a transmission that is installed in a vehicle having a power generation source whose operation is automatically stopped as the vehicle becomes stationary, is capable of changing motive power applied to an input shaft from the power generation source at speed change ratios corresponding to a plurality of shift speeds established by engaging and disengaging a plurality of engagement elements and transferring the resultant motive power to an output shaft, establishes a first shift speed by engaging both a first engagement element and a one-way clutch, and establishes a shift speed having a speed change ratio smaller than the first shift speed by engaging both the first engagement element and the second engagement element, the control method for the transmission comprising the steps of:
a) in a case in which a shift speed having a speed change ratio smaller than the first shift speed is established when the operation of the power generation source is stopped in response to an automatic stop request for the power generation source, determining whether a non-driving state in which the input shaft of the transmission is not rotationally driven by motive force from the power generation source is established; and
b) in a case in which it is determined at step a) that a driving state in which the input shaft of the transmission is rotationally driven by the motive force from the power generation source is established, not disengaging the second engagement element, and in a case in which it is determined at step a) that the non-driving state is established, disengaging the second engagement element.

* * * * *